Oct. 9, 1956 M. J. DI TORO 2,766,325

NARROW BAND COMMUNICATION SYSTEM

Filed Sept. 1, 1951 2 Sheets-Sheet 1

INVENTOR
MICHAEL J. DiTORO
BY Percy P. Lantzy
ATTORNEY

INVENTOR
MICHAEL J. DiTORO
BY Percy P. Lantzy
ATTORNEY

United States Patent Office 2,766,325
Patented Oct. 9, 1956

2,766,325

NARROW BAND COMMUNICATION SYSTEM

Michael J. Di Toro, Bloomfield, N. J., assignor to International Telephone and Telegraph Corporation, a corporation of Maryland Application September 1, 1951, Serial No. 244,766

13 Claims. (Cl. 179—15.55)

This invention relates to a system for reducing the band width requirements of a communication system, and more particularly, a system for facilitating the transmission of wide frequency band signals, as for instance speech, within a relatively narrow frequency band.

The information transmitted by speech does not, at any one time, necessarily require all the frequency space allotted to it by the human voice. Speech messages can be compressed in band width without deterring appreciably from the intelligence thereby conveyed. The spectrum profile of voiced sounds does not have too large a curvature with frequency, so that narrow bands of frequency may be sampled, and in reconstruction, extrapolation can be used to extend the spectrum below and above the sampled portions. This method of frequency compression is based upon the assumption that the ear will have a better chance of recognizing the voiced sounds spectrum profile if one takes samples of this profile over the whole spectrum rather than using all of the available band width of the transmitting channel in just one part of the speech spectrum.

In system heretofore proposed for band width compression, the amount of equipment required to obtain the desired reduction in band width is objectionably large, and economically justifiable only when a great premium is placed on band width conservation.

One of the objects of this invention, therefore, is to provide a communication system to transmit a wide frequency band signal within a relatively narrow frequency band which overcomes the aforementioned objections.

Another object of this invention is to provide a communication system capable of transmitting a wide frequency band signal within a relatively narrow frequency band which is readily adaptable to existing communication systems.

Briefly, in this invention, the original wide frequency band is sampled by judiciously located frequency sub-bands whose total spectrum width is a fraction of the original signals spectrum width. The sub-bands are then by suitable modulation, contiguously placed so as to occupy only a fraction of the original frequency spectrum. After transmission and reception, the sub-bands are separated by filters and restored by modulation to their original location in the frequency spectrum. Along with this is included some extrapolation or widening of the sub-bands so as to fill in the unsampled portions of the original spectrum and substantially reproduce the original input signal.

Figure 1:
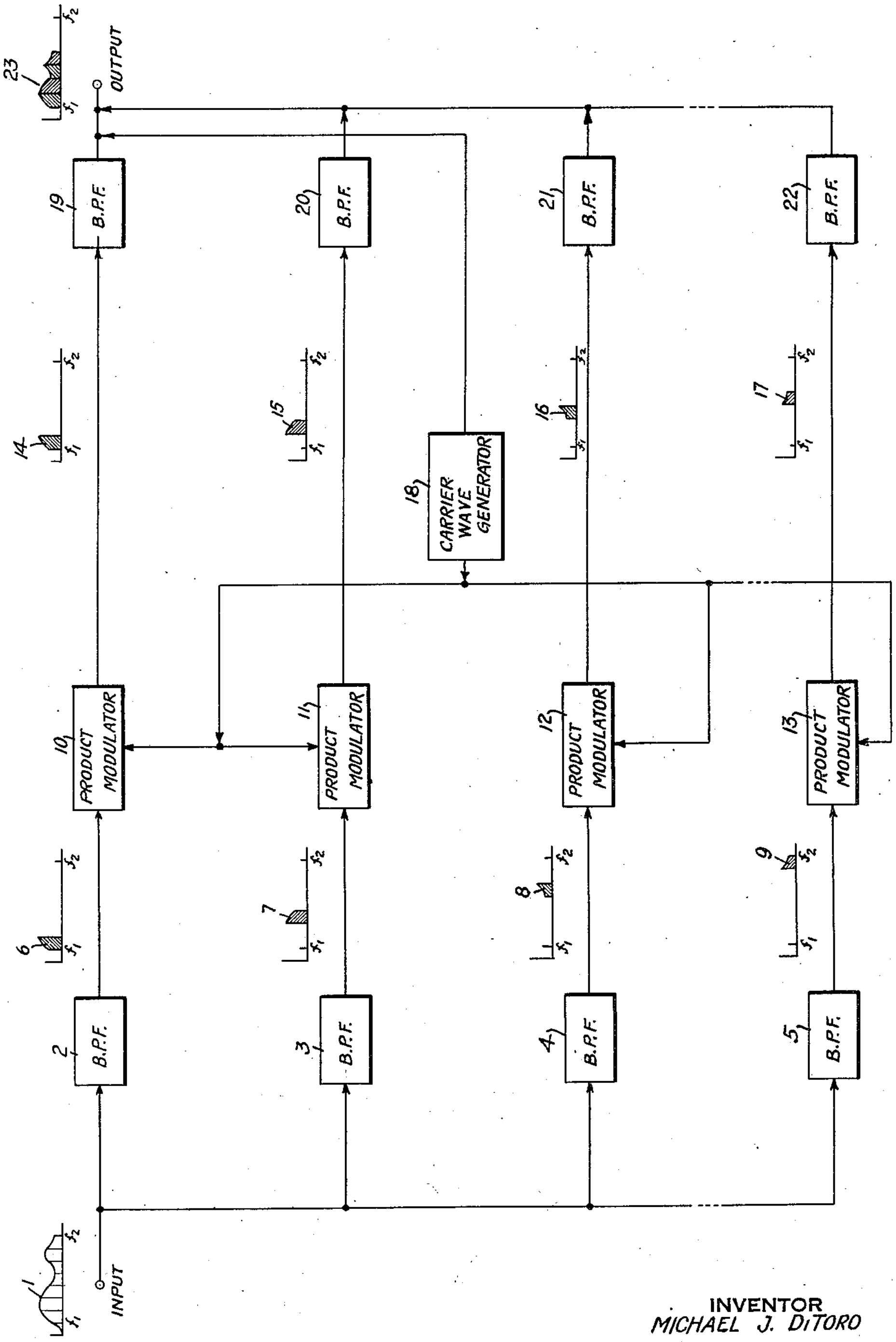
Figure 2:
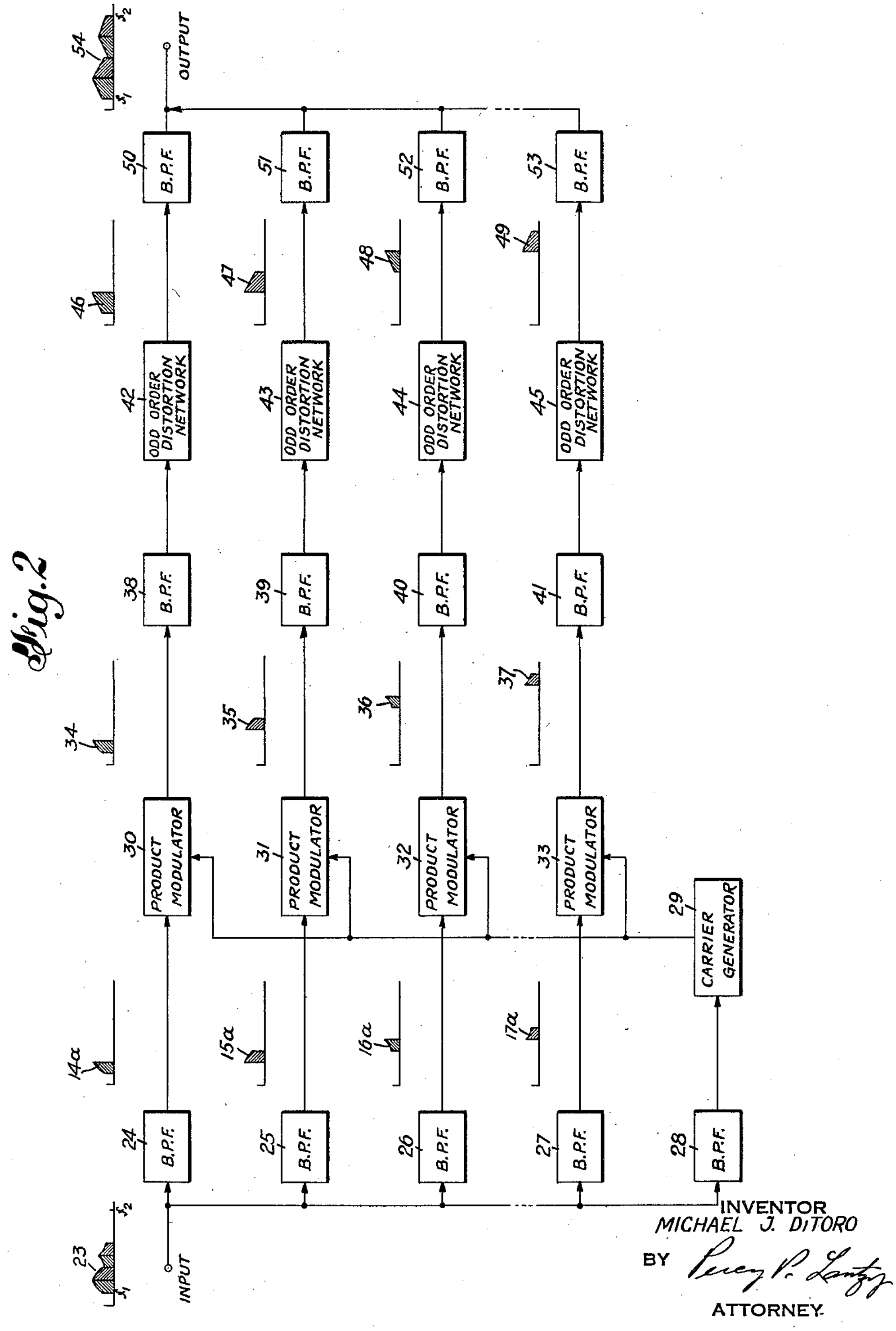

The above-mentioned and other features and objects of this invention and the manner of attaining them will become more apparent by reference to the following description taken in conjunction with the accompanying drawings, wherein:

Fig. 1 shows, in block-schematic form, the transmitting equipment employed in an embodiment of this invention; and Fig. 2 shows, in block-schematic form, the receiver employed in an embodiment of this invention.

Referring to Fig. 1 of the drawing, an input signal 1 will be considered for purposes of simplification in explaining the operation of the system. The invention will be described with particular reference to speech waves, although the invention is equally applicable to other types of waves such as music and waves used to produce visual effects or the like. The input signal 1 is shown extending between two reference frequencies $f_1$ and $f_2$. This input signal is fed into the transmitter to the band pass filters 2, 3, 4, and 5 in parallel. It should be noted, however, that the limit of four samples is only given as an illustration, it being clear that a greater or lesser number of portions of the original input signal may be sampled, as may be desired. Each band pass filter samples a predetermined portion of the original input signal as illustrated by the curves 6, 7, 8, and 9. The remainder of the input signal is removed by the action of these filters 2 to 5. The samples of the original input signal 6, 7, 8, and 9 are respectively fed to the product modulators 10, 11, 12, and 13. The product modulators, by suitable modulation, transpose the narrow sub-band samplings to contiguous locations in the frequency spectrum forming a narrow transmission band whose total band width is a fraction of the original input signals frequency spectrum, as illustrated in curves 14, 15, 16, and 17. A carrier wave generator 18 provides a carrier wave for the product modulators 10, 11, 12, and 13 and also supplies a carrier frequency signal wave which is combined at the output of the transmitter with the transposed narrow frequency sub-bands after the sub-bands have been passed through band pass filters 19, 20, 21, and 22 which eliminate any undesirable frequencies which might be introduced by the product modulators. Thus it is seen that the output of the transmitter contains a wave form substantially as illustrated in curve 23 and, in addition, a carrier signal which is superimposed or combined with this relatively narrow frequency band signal.

In order that the original spectrum may be restored at the receiver, it is necessary that the intermodulation products transmitted are accompanied by at least two harmonics of the original input signal. However, the nature of the sampling action of the band pass filter is such that this requirement is guaranteed for most voiced signals encountered.

Referring now to Fig. 2, the transmitted wave is fed in parallel to band pass filters 24, 25, 26, and 27 and a further band pass filter 28 which separates the narrow sub-band samplings and the carrier wave. The separated sub-bands are indicated at 14*a*, 15*a*, 16*a*, and 17*a*, respectively. A carrier generator 29 responsive to the transmitted carrier frequency feeds a carrier wave to product modulators 30, 31, 32, and 33 which transpose the transmitted narrow sub-band samplings to their original position in the frequency spectrum as illustrated in curves 34, 35, 36, and 37. Additional band pass filters 38, 39, 40, and 41 eliminate undesirable frequencies introduced by the product modulators. The transposed narrow sub-band samplings are then fed in series to any suitable odd order distortion network 42, 43, 44, and 45. Such a distortion network in its simplest form can consist of two amplifiers operating in push-pull relationship, biased such that each operates along the curved or distorted portion of their grid-plate current characteristic. The distortion networks basically function to extrapolate or widen the sub-band samplings so as to fill in the unsampled parts of the original spectrum as illustrated in curves 46, 47, 48, and 49. The individual distorted speech samples are fed to respective band pass filters 50, 51, 52, and 53 which operate to remove any extraneous or fringing components resulting from the distortion network. Then the filtered components are combined at the output of the receiver into substantially the wave form of curve 54. The original input signal characteristics are not identically reproduced at the output of the receiver, but the human ear will correct for the error introduced by the extrapolation.

While I have described above the principles of my invention in connection with specific apparatus, it is to be clearly understood that this description is made by way of example only and not as a limitation to the scope of my invention as set forth in the objects thereof and in the accompanying claims.

I claim:

1. A system for transmitting within a relatively narrow band width signals having a wide band of frequencies, comprising a source of wide band signals, means for producing a plurality of different narrow sub-bands of frequencies non-contiguous in the frequency spectrum from parts of said wide band, means for transposing said frequency spaced sub-bands to contiguous positions in the frequency spectrum to form a signal having a narrow frequency band, and means for transmitting said signal having a narrow frequency band.

2. A system for transmitting a signal having a wide frequency range within a relatively narrow band width, comprising a source of wide frequency range signals, means for producing a plurality of different narrow frequency sub-band sampling of said signals in non-contiguous positions in the frequency spectrum, means for transposing said narrow frequency sub-band samplings to contiguous positions in the frequency spectrum to provide a narrow frequency transmission band, means of identifying the original frequency allocation of said narrow sub-bands within the original frequency spectrum, and means for transmitting said narrow frequency transmission band.

3. In a transmission system having input signals in the audio frequency range, means for subdividing part of the frequency band of said input signals in a plurality of individual frequency sub-bands non-contiguous in the frequency spectrum, means for translating said individual frequency sub-bands to contiguous positions in the frequency spectrum, means for identifying the original frequency allocation of said translated frequency sub-bands, means for transmitting said translated frequency sub-bands and said identifying signals.

4. A communication system for transmission, within a relatively narrow frequency non-contiguous in the frequency spectrum band width, signals having a wide frequency band, comprising a transmitter having means for producing a plurality of different narrow sub-bands of frequency from parts of said wide band signal, and means for transposing said frequency spaced sub-bands to contiguous positions in the frequency spectrum for transmission, a receiver to receive said sub-band signals from said transmitter, said receiver having means for restoring said transposed frequency sub-bands to their original positions in the frequency spectrum and means to fill in the omitted portions of the original frequency spectrum to substantially reproduce the original signal at the receiver output.

5. A system according to claim 4, wherein the means for producing narrow sub-bands of frequency consists of a plurality of band pass filters.

6. A system according to claim 4, wherein said means to transpose said narrow sub-bands of frequency includes a product modulator for each of said sub-bands.

7. A system according to claim 4, wherein the means for restoring said transposed narrow sub-bands of frequency to their original position in the frequency spectrum includes a plurality of band pass filters to separate the said sub-bands and product modulators to transpose said narrow sub-bands to their original positions in the frequency spectrum.

8. A communication system for transmission, within a relatively narrow frequency bandwith, signals having a wide frequency band, comprising a transmitter having means for producing narrow sub-bands of frequency from parts of said wide band signal, and means for transposing said sub-bands to contiguous positions in the frequency spectrum for transmission, a receiver to receive said sub-band signals from said transmitter, said receiver having means for restoring said transposed frequency sub-bands to their original positions in the frequency spectrum, and means to fill in substantially the omitted portions of the original frequency spectrum which includes means to sample the transposed narrow sub-bands of frequency at their lower and upper frequencies, and means to subject these samples to asymmetrical distortion thereby increasing the band width on either side of the lower and upper frequencies of each of the said sub-bands.

9. A communication system for transmission, within a relatively narrow frequency bandwidth, signals having a wide frequency band, comprising a transmitter having means for producing narrow sub-bands of frequency from parts of said wide band signal, and means for transposing said sub-bands to contiguous positions in the frequency spectrum for transmission, a receiver to receive said sub-band signals from said transmitter, said receiver having means for restoring said transposed frequency sub-bands to their original positions in the frequency spectrum, and means to fill in substantially the omitted portions of the original frequency spectrum which includes a plurality of odd order distortion networks to substantially reproduce the original signal at the receiver output.

10. A communication system for transmission, within a narrow frequency band width, of signals having a wide frequency band width, comprising a transmitter having a plurality of band pass filters producing a plurality of narrow sub-bands of frequency whose total band width is a fraction of the original input signal's band width, product modulators to transpose said narrow sub-bands to contiguous positions on the frequency spectrum, a carrier frequency generator to supply a carrier wave frequency for the product modulators, means to combine carrier wave frequency energy from said generator and the intermodulation product outputs of said modulators, and means to transmit said combination, a receiver coupled to said transmitter having means to separate the said transposed narrow sub-bands and carrier frequency, product modulators to transpose said narrow sub-bands to their original position in the frequency spectrum, a carrier frequency generator responsive to said identifying signal to supply a carrier wave for the product modulators, band pass filters to eliminate the intermodulation products outside the frequency range of the desired narrow sub-bands, means to extrapolate said sub-bands to fill in unsampled portions of the original frequency spectrum, and means to combine said extrapolated sub-bands in the output of said receiver.

11. A receiver for reception of a signal made up of narrow frequency sub-bands selected from an original wide frequency band signal and transposed to contiguous positions in the frequency spectrum of the signal transmitted, comprising means for restoring said transposed narrow frequency sub-bands to their original positions in the frequency spectrum, and means to fill in the omitted portions of the original frequency spectrum to substantially reproduce said original signal, said means to fill in the omitted portions of the original frequency spectrum consisting of a plurality of odd order distortion networks.

12. A receiver for reception of a signal made up of narrow frequency sub-bands selected from an original wide frequency band signal and transposed to contiguous positions in the frequency spectrum of the signal transmitted, comprising means for restoring said transposed narrow frequency sub-bands to their original positions in the frequency spectrum, and means to fill in substantially the omitted portions of the original frequency spectrum which includes means to sample the transposed narrow sub-bands of frequency at their lower and upper frequencies, and means to subject these samples to asymmetrical distortion thereby increasing the band width on either side of the lower and upper frequencies of each of the said sub-bands.

13. A receiver for reception of a signal made up of narrow frequency sub-bands selected from an original wide frequency band signal, transposed to contiguous positions in the frequency spectrum of the signal transmitted and a signal for identifying the original frequency allocation of said sub-bands, comprising means to separate the said transposed narrow frequency sub-bands and the identifying signal, modulators to transpose said narrow sub-bands to their original position in the frequency spectrum, a carrier frequency generator responsive to said identifying signals to supply a carrier wave for the modulators, band pass filters to eliminate the intermodulation products outside the frequency range of the desired narrow sub-bands, means to extrapolate said sub-bands to fill in unsampled portions of the original frequency spectrum and means to combine said extrapolated sub-bands in the output of said receiver.

References Cited in the file of this patent

UNITED STATES PATENTS

| | | |
|---|---|---|
| 2,009,438 | Dudley | July 30, 1935 |
| 2,117,739 | Miller | May 17, 1938 |
| 2,151,091 | Dudley | Mar. 21, 1939 |
| 2,411,206 | Guanella | Nov. 19, 1946 |
| 2,509,064 | Huber | May 23, 1950 |